(12) United States Patent
Lablans

(10) Patent No.: US 7,772,999 B2
(45) Date of Patent: Aug. 10, 2010

(54) N-STATE RIPPLE ADDER SCHEME CODING WITH CORRESPONDING N-STATE RIPPLE ADDER SCHEME DECODING

(76) Inventor: Peter Lablans, 8 Harvey Ct., Morris Township, NJ (US) 07960

( * ) Notice: Subject to any disclaimer, the term of this patent is extended or adjusted under 35 U.S.C. 154(b) by 60 days.

(21) Appl. No.: 12/330,255

(22) Filed: Dec. 8, 2008

(65) Prior Publication Data
US 2009/0146851 A1    Jun. 11, 2009

Related U.S. Application Data

(60) Provisional application No. 61/012,548, filed on Dec. 10, 2007.

(51) Int. Cl.
*H03M 7/34* (2006.01)

(52) U.S. Cl. .................. 341/50; 380/42; 380/44

(58) Field of Classification Search ............. 341/50, 341/57; 375/242, 146, 130, 343; 380/44, 380/42; 708/250, 492; 713/189
See application file for complete search history.

(56) References Cited

U.S. PATENT DOCUMENTS 6,452,958 B1 *   9/2002   van Nee ............... 375/130

\* cited by examiner

*Primary Examiner*—Rexford N Barnie
*Assistant Examiner*—Joseph Lauture
(74) *Attorney, Agent, or Firm*—Diehl Servilla LLC

(57) ABSTRACT

Methods and apparatus for implementing an n-state ripple-adder scheme coder with $n \geq 2$ using an n-state reversible switching function and a non-reversible n-state switching function acting upon a first and a second word of at least 2 n-state symbols are disclosed. Corresponding decoding methods and apparatus are also disclosed. A resulting codeword may be a codeword which can be decoded by using the identical or different n-state switching functions in a corresponding ripple adder scheme decoder. Feistel networks and LFSRs apply the coding and decoding. Systems using the coding and decoding methods may be communication, storage and/or financial systems.

22 Claims, 5 Drawing Sheets

N-STATE RIPPLE ADDER SCHEME CODING WITH CORRESPONDING N-STATE RIPPLE ADDER SCHEME DECODING

STATEMENT OF RELATED CASES

This application claims the benefit of U.S. Provisional Patent Application No. 61/012,548 filed on Dec. 10, 2007 which is incorporated herein by reference in its entirety.

BACKGROUND OF THE INVENTION

This invention relates to the reversible coding of sequences of 2 or more binary or n-state symbols. More specifically it provides novel methods and apparatus for coding a first plurality of symbols with a second plurality of symbols using at least one reversible logic function and one non-reversible logic function.

In general coding of plurality of symbols comprises using binary symbols, and combining symbols by using a binary reversible logic function, usually the XOR function. The other reversible binary logic function is the EQUAL function.

The use of the XOR (also known as modulo-2 addition) is well known. This means that unauthorized users trying to read a coded digital message of binary symbols can make a reliable assumption that coding of the message uses the XOR function. This facilitates unauthorized decoding of a message. Messages using n-state symbols often are recoded into binary symbols. These messages are often coded by using again the XOR function, for instance by using additions over $GF(n=2^p)$, which can be expressed as a plurality of XOR functions.

Accordingly novel and improved methods and apparatus applying a wider range of less predictable functions than only the XOR function for coding messages of binary and n-state symbols are required.

SUMMARY OF THE INVENTION

In view of the more limited possibilities of the prior art in creating binary and n-state reversible coders novel and improved apparatus and methods to create coders and decoders are required.

Binary in the context of this application means 2-valued or 2-state. Multi-valued, n-valued or n-state in the context of this invention means an integer equal to or greater than 2. It is to be understood that the value of a state is to indicate as difference with another state. Accordingly an n-state signal means a signal having one of n states. A signal represents an n-state symbol, and is preferably a single element. However a single n-state symbol can also be represented by a plurality of p-state symbols with p<n.

A symbol herein is always represented by one or more signals. A symbol is an n-state symbol having one of at least two states if binary is included, or has one of at least three states if binary symbols are excluded. An n-state symbol may be represented by at least two p-state symbols when p<n. An n-state symbol may also be represented by an n-state signal. An n-state symbol may be represented by a plurality of binary symbols and by a plurality of binary signals. Even if only the word symbol is used without the word signal, it is assumed and intended herein that a symbol can be represented by one or more signals which can be processed by binary and/or n-state switches.

One object of the present invention is to provide new methods and apparatus to implement an n-state reversible ripple adder scheme coder with a corresponding ripple adder scheme decoder.

In accordance with one aspect of the present invention a method of coding with a computing device is provided of a first plurality of p n-state symbols with p and n≧2 into a codeword of p n-state symbols comprising inputting the first plurality of p n-state symbols on the computing device, inputting a second plurality of n-state symbols on the computing device, processing each of p corresponding n-state symbols in the first and the second plurality of p n-state symbols with a first n-state function to generate a third plurality of p n-state symbols, processing at least one set of corresponding n-state symbols in the first and the second plurality of p n-state symbols with a second n-state function to generate one or more n-state transfer symbols, processing the third plurality of n-state symbols and the one or more n-state transfer symbols with a third n-state logic function, and generating on an output of the computing device the codeword of p n-state symbols.

In accordance with a further aspect of the present invention the method is provided, wherein the first and the second n-state logic function are not a modulo-n adder and a corresponding modulo-n carry function.

In accordance with yet a further aspect of the present invention the method is provided, wherein the first n-state logic function is a reversible logic function.

In accordance with yet a further aspect of the present invention the method is provided, wherein the first and the third n-state logic function are the same n-state logic function.

In accordance with yet a further aspect of the present invention the method is provided, wherein the first n-state logic function is a reversible logic function.

In accordance with yet a further aspect of the present invention the method is provided, further comprising processing a complete ripple of n-state transfer symbols through the first plurality of n-state symbols.

In accordance with yet a further aspect of the present invention the method is provided, wherein the codeword is generated in a Feistel network.

In accordance with yet a further aspect of the present invention the method is provided, wherein an n-state symbol is represented by one or more binary signals.

In accordance with yet a further aspect of the present invention the method is provided, wherein an n-state logic function is implemented with binary circuitry.

In accordance with yet a further aspect of the present invention the method is provided, wherein the computing device is part of a communication system.

In accordance with yet a further aspect of the present invention the method is provided, wherein the computing device is part of a financial system.

In accordance with yet a further aspect of the present invention the method is provided, further comprising a corresponding method to retrieve from the codeword the first plurality of p n-state symbols.

In accordance with another aspect of the present invention, an apparatus is provided for coding a first plurality of p n-state symbols with p and n≧2 into a codeword of p n-state symbols comprising a processor with memory, the memory enabled to store and retrieve instructions, the processor executing the instructions on signals representing n-state symbols to perform the steps of receiving the first plurality of p n-state symbols on a first input, receiving a second plurality of n-state symbols on a second input, processing each of p corresponding n-state symbols in the first and the second plurality of p n-state symbols with a first n-state function to generate a third plurality of p n-state symbols, processing at least one set of corresponding n-state symbols in the first and the second plurality of p n-state symbols with a second n-state function to generate one or more n-state transfer symbols, processing the third plurality of n-state symbols and the one or more n-state transfer symbols with a third n-state logic function, and generating on an output the codeword of p n-state symbols.

In accordance with yet another aspect of the present invention, the apparatus is provided, wherein the first and the second n-state logic function are not a modulo-n adder and a corresponding modulo-n carry function.

In accordance with yet another aspect of the present invention, the apparatus is provided, wherein the first n-state logic function is a reversible logic function.

In accordance with yet another aspect of the present invention, the apparatus is provided, wherein the first and the third n-state logic function are the same n-state logic function.

In accordance with yet another aspect of the present invention, the apparatus is provided, wherein the first n-state logic function is a reversible logic function.

In accordance with yet another aspect of the present invention, the apparatus is provided, further comprising processing a complete ripple of n-state transfer symbols through the first plurality of n-state symbols.

In accordance with yet another aspect of the present invention, the apparatus is provided, wherein the codeword is generated in a Feistel network.

In accordance with yet another aspect of the present invention, the apparatus is provided, wherein an n-state symbol is represented by one or more binary signals.

In accordance with yet another aspect of the present invention, the apparatus is provided, wherein an n-state logic function is implemented with binary circuitry.

In accordance with yet another aspect of the present invention, the apparatus is provided, wherein the apparatus is part of a financial system.

In accordance with yet another aspect of the present invention, the apparatus is provided, further comprising an apparatus to retrieve from the codeword the first plurality of p n-state symbols.

In accordance with an aspect of the present invention, an n-valued a method is provided of coding a plurality of p n-state symbols with p and n≧2 into a first codeword of p symbols comprising using the plurality of n-state symbols as an augend, using a second plurality of n-state symbols as an addend, generating a codeword of p symbols by applying a ripple adder scheme coder having a corresponding ripple scheme decoder to the augend and the addend with a reversible function from a set of n-state reversible functions and a non-reversible function from a set of n-state non-reversible functions.

In accordance with another aspect of the present invention, a method is provided wherein the set of n-state reversible functions is a first set of n-state reversible functions as defined in the specification.

In accordance with a further aspect of the present invention, a method is provided wherein the set of n-state reversible functions is a second set of n-state reversible functions as defined in the specification.

In accordance with another aspect of the present invention, a method is provided, wherein the set of n-state reversible functions is a third set of n-state reversible functions.

In accordance with a further aspect of the present invention, a method is provided, wherein the set of n-state non-reversible functions is a first set of n-state non-reversible functions as defined in the specification.

In accordance with another aspect of the present invention, a method is provided, wherein the set of n-state non-reversible functions is a second set of n-state non-reversible functions as defined in the specification.

In accordance with a further aspect of the present invention, a method is provided, wherein the set of n-state non-reversible functions is a third set of n-state non-reversible functions as defined in the specification.

In accordance with another aspect of the present invention, a method is provided, wherein augend and addend can be used interchangeable.

In accordance with a further aspect of the present invention, a method is provided, wherein the corresponding decoder is part of a computing device.

In accordance with another aspect of the present invention, a method is provided, wherein the computing device is part of a communication system.

In accordance with a further aspect of the present invention, a method is provided, wherein the computing device is part of a financial system.

In accordance with another aspect of the present invention, a method is provided, wherein n>2.

In accordance with a further aspect of the present invention, a method is provided, wherein decoding is performed by a two's complement ripple adder scheme.

BRIEF DESCRIPTION OF THE DRAWINGS

Various other objects, features and attendant advantages of the present invention will become fully appreciated as the same becomes better understood when considered in conjunction with the accompanying drawings, and wherein.

DETAILED DESCRIPTION OF THE INVENTION

Figure 1:
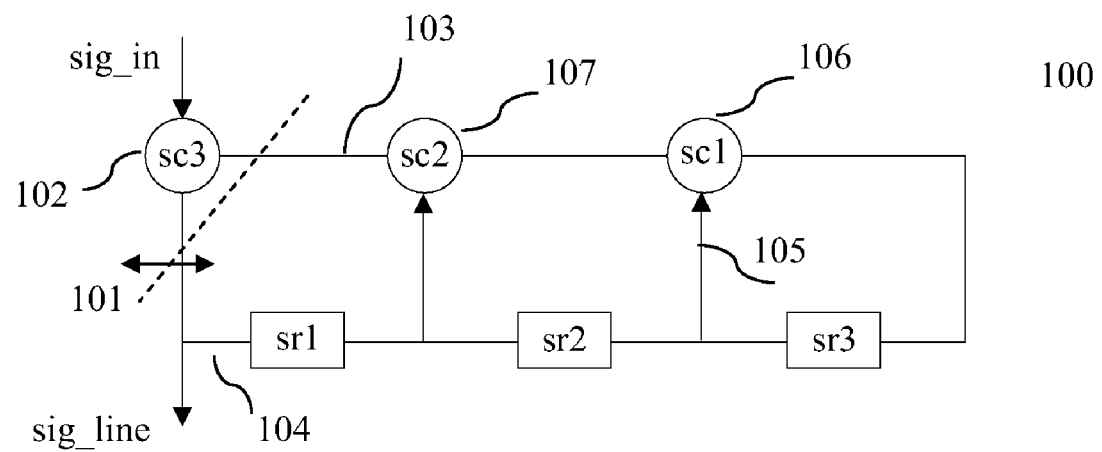
FIG. 1 is a diagram of an n-state Fibonacci LFSR based scrambler in accordance with an aspect of the present invention.

Using the XOR function for coding binary and n-state symbols is well established and will not be explained herein. However one aspect of the XOR function should be highlighted and that is the aspect of being self-reversing. This means that combining two symbols A and B by a XOR will generate symbol C in accordance with A XOR B→C. The self reversing property allows determining for instance A when B and C are known in accordance with C XOR B→A.

A, B and C may also be a plurality of binary symbols wherein the XOR is operated upon the individual bits as is known to someone of ordinary skills in the art of binary logic and coding. In general coding may consist of confusing an unauthorized user by using different transposition and substitution schemes. An authorized user familiar with the schemes may reverse the coder as a decoder and recover the original message. It is common to combine a message (for instance A) with a key (for instance B) which is only known to authorized users. A message C created from A XOR B can only be decoded if the key B is known.

Clearly reversibility is an important aspect of coding. The terms coding and decoding are used herein. The methods of using transformation schemes for symbols are generally known as encipherment and specific methods are called ciphers. It is to be understood that coding herein means encipherment and that a code herein is a cipher.

The XOR function can be used to code a message continuously as a streaming cipher. The XOR function may also be used to code blocks or words of symbols, for instance per 8-bits or bytes. This usually requires synchronization of the words and such a coder is called a block coder.

One interesting coding operation that is reversible is addition of a word of symbols with another word of symbols. The two operations that are used in such coder may be the common addition for instance for coding and subtraction for example for decoding, though subtraction may also be used for coding and addition for decoding. It is really the combination of two functions that is required.

Addition means usually applying a ripple adder wherein a modulo-n residue and a carry are generated and the operation of modulo-n addition and carry generation are continued until no more carry is present. Ripple adders and their counter parts in binary and n-state form are known. For an example of a binary and a 3-state ripple adder is for instance referred to the website www.nstatelogic.com.

A classical radix-n addition comprises two operations: generation of a modulo-n addition residue and the addition with the radix-n residue of a radix-n carry. The carry may propagate through intermediate sums until no further carry is generated. In radix-2 or binary logic the modulo-2 addition is the XOR function. The carry is determined by applying the AND function.

Because addition and subtraction are generally viewed as arithmetical operations the switching logic of subtraction is usually explained as two's complement addition. This means that the subtraction is presented as realized with the same functions as in addition. However in a switching sense the addition and subtraction are a pair of reversible operations and no advance change of the symbols (by complementing them) should be required. In fact a radix-2 subtraction is a combination of two operations like the addition: a modulo-2 subtraction, which is also the binary XOR switching function and the determination of a borrow symbol with a binary switching borrow function 'sb' which is determined by the following truth table 'sb'.

| sb | 0 | 1 |
|---|---|---|
| 0 | 0 | 1 |
| 1 | 0 | 0 |

When the subtraction is written as A-B then A is represented by the rows in the truth tables and B by the columns. The truth table means in radix-2 arithmetic that one has to borrow a 1 from the more significant digit if B>A.

The following table shows a complete ripple subtraction or addition calculation for a 3 symbol word.

|     | a3<br>d3 | a2<br>d2 | a1<br>d1 |
|-----|---|---|---|
| sc  | (a3 sc d3) | (a2 sc d2) | (a1 sc d1) |
| scb | (a2 sb d2) | (a1 sb d1) | — |
| sc  | (a3 sc d3) sc (a2 sb d2) | (a2 sc d2) sc (a1 sb d1) | |
| scb | (a2 sc d2) scb (a1 sb d1) | — | |
| sc  | [(a3 sc d3) sc (a2 sb d2)] sc [(a2 sc d2) scb (a1 sb d1)] | | |

A recursive way of showing the process of calculating the sum or difference is:

|     | a3<br>d3 | a2<br>d2 | a1<br>d1 |
|-----|---|---|---|
| sc  | a31 | a21 | a11 |
| scb | d31 | d21 | — |
| sc  | a32 | a22 | |
| scb | d32 | — | |
| sc  | d33 | | |

In case of the binary addition it should be clear that switching function 'sc' is the XOR function and 'scb' is the AND function. In case of the subtraction 'sc' is again the XOR and 'scb' is the non-commutative A<B function.

For instance, assume that one has a 4-bit word W=[1 1 1 1] and a 'key' K=[1 0 1 0]. An addition C=W+K=[1 0 0 1] and W=C−K=[1 0 0 1]−[1 0 1 0]=[1 1 1 1]. The final carry will not be shown (as it would make the word 5 bits). It is also assumed that a final 'borrow' symbol as required is always available.

One may also start with a subtraction: C=W−K=[1 1 1 1]−[1 0 1 0]=[0 1 0 1]. As decoding: W=C+K=[0 1 0 1]+[1 0 1 0]=[1 1 1 1].

For the purpose of illustrative examples the coding and decoding are performed from right to left, as in an arithmetical calculation. It should be clear that this order of execution is not required. One may also calculate the 'carry' and 'borrow' from left to right. Or for that matter one may select a complete different order of execution as long as coding and decoding is performed in the same order.

The above raises the following questions: a. in the binary case 1. are there other 'carry' and 'borrow' functions that combined with the XOR function allow for reversible coding; and 2. are there other reversible functions than the XOR function that will allow combined coding and decoding with a transitional 'carry' and 'borrow'. The next question is then: can n-state functions with n>2 be found that perform similar reversible coding schemes; and b. what about the n-state case with n>2.

Binary Functions

The earlier provided coding and decoding expressions per symbol can be executed in a computer program. Suppose that a coder and a decoder both apply the XOR as the reversible function. By using a function sb1 for determining a 'carry' in a multi-symbol coder and a function sb2 for determining a 'borrow' in a decoder and checking for all possible states of the symbols one can determine if there are combinations of XOR and sb1 that code a word of bits in such a way that a combination of XOR and sb2 will decode the coded word into its original form. It may turn out that for very short words (2 symbol words) there is a greater variety of combinations than for instance words with 4 or more bits. The length of a word in number of symbols that is covered by the coding/decoding scheme is called the reach of the coding/decoding scheme. The reach is provided by the number of symbols in a word that can be correctly coded and decoded.

Combinations of functions for coding and decoding short words are fully contemplated and are an aspect of the present invention. For illustrative purposes the examples provided herein will be mainly limited to what one may call universal combinations which are not limited to certain words or lengths of words. This is, as will shown below, that there are many possible combinations of such functions when one looks at symbols with states n>2. However, these combinations for short words are recognized and fully contemplated. An example will be provided.

It turns out that there is indeed a combination of two binary functions that will perform the 'carry' and 'borrow' tasks combined with the XOR function. These functions are the NAND function and the binary function determined by the truth table

| sb2 | 0 | 1 |
|-----|---|---|
| 0   | 1 | 0 |
| 1   | 1 | 1 |

For instance the codeword [1 1 1 1] with key [1 0 1 0] using XOR as 'sc' and NAND as 'sb' will generate [0 0 1 1] as codeword. Applying XOR as 'sc' and sb2 as 'scb' will recover the codeword [1 1 1 1].

For illustrative purposes the coding with XOR and sb2 and decoding with XOR and NAND will be shown in the following tables for C=W⊕K, wherein ⊕ is used to indicate coding, which combines 'sc' and 'scb'; decoding then is W=C⊗K, wherein ⊗ is used to indicate decoding which may use a different combination of 'sc' and 'scb'.

| | W | | | |
|---|---|---|---|---|
| | 1 | 1 | 1 | 1 |
| | K | | | |
| | 1 | 0 | 1 | 0 |
| XOR | 0 | 1 | 0 | 1 |
| sb2 | 1 | 1 | 1 | — |
| XOR | 1 | 0 | 1 | |
| sb2 | 1 | 0 | — | |
| XOR | 0 | 0 | | |
| sb2 | 1 | — | | |
| XOR | 1 | | | |
| C = W ⊕ K | 1 | 0 | 1 | 1 |

One can repeat the above coding by applying the appropriate functions as in a ripple adder. Instead of the AND function for determining a carry, one now applies the binary function determined by the truth table 'sb2'.

Decoding the word is then using C in the position of W, apply the same key K and use the functions XOR and NAND as in the ripple adder wherein the AND is now replaced by the NAND. The process is shown in the following table.

| | C | | | |
|---|---|---|---|---|
| | 1 | 0 | 1 | 1 |
| | K | | | |
| | 1 | 0 | 1 | 0 |
| XOR | 0 | 0 | 0 | 1 |
| NAND | 1 | 0 | 1 | — |
| XOR | 1 | 0 | 1 | |
| NAND | 1 | 1 | — | |
| XOR | 0 | 1 | | |
| NAND | 1 | — | | |
| XOR | 1 | | | |
| W = C ⊗ K | 1 | 1 | 1 | 1 |

An example of a novel coder/decoder combination for very short codewords is for instance the combination of XOR and NOR which will serve both for coder and decoder for words of 2 bits.

As a further aspect of the present invention one may select the EQUAL function as 'sc'.

One may use a coder and a decoder using the EQUAL function in a ripple adder type coding or scheme wherein 'carry' and 'borrow' are determined by either the NOR function or by a function sb3 which is determined by the following truth table:

| sb3 | 0 | 1 |
|-----|---|---|
| 0   | 0 | 0 |
| 1   | 1 | 0 |

The truth tables of the EQUAL function and the NOR function are provided in the following tables:

| NOR | 0 | 1 |
|-----|---|---|
| 0   | 1 | 0 |
| 1   | 0 | 0 |

| EQUAL | 0 | 1 |
|-------|---|---|
| 0     | 1 | 0 |
| 1     | 0 | 1 |

As an illustrative example the word W=[1 1 1 1] is coded with ripple addition using the EQUAL function and 'sb3' for generating the 'carry'. In this example the symbols are coded from right to left. It should be clear that coding may take place from left to right. It may also take place starting from any of the symbols in the word. It may involve all the symbols of the word; the coding scheme may also involve fewer than all symbols in a word. One may also use a transpositional order of symbols to be coded. For instance, one may start at symbol 2 in a four symbol word; then process symbol 4; then symbol 1 and end with symbol 3. Any other order may be used, as long as the same starting position and order is used in decoding. This may be helpful as at least one symbol, in accordance with the coding method provided as an aspect of the present invention is a straight coding by function 'sc' without being affected by a 'carry' or a 'borrow'. By not putting a 'first coded' symbol in an obvious position one may make cryptanalysis more difficult. This 'hiding' of the first position is also helpful in n-state coding with n>2 where there are more than 2 reversible functions 'sc'.

In the following table W is coded with a key K=[1 0 1 0].

|  | W | | | |
|---|---|---|---|---|
|  | 1 | 1 | 1 | 1 |
|  | K | | | |
|  | 1 | 0 | 1 | 0 |
| EQUAL | 1 | 0 | 1 | 0 |
| sb3 | 1 | 0 | 1 | — |
| EQUAL | 1 | 1 | 1 | |
| sb3 | 0 | 0 | — | |
| EQUAL | 0 | 0 | | |
| sb3 | 1 | — | | |
| EQUAL | 1 | | | |
| C = W ⊕ K | 0 | 0 | 1 | 0 |

For decoding, the EQUAL function is used with the NOR function to determine the 'borrow'. One has to use the same key K. The process of decoding is shown in the following table

|  | C | | | |
|---|---|---|---|---|
|  | 0 | 0 | 1 | 0 |
|  | K | | | |
|  | 1 | 0 | 1 | 0 |
| EQUAL | 0 | 1 | 1 | 1 |
| NOR | 1 | 0 | 1 | — |
| EQUAL | 0 | 0 | 1 | |
| NOR | 0 | 0 | — | |
| EQUAL | 1 | 1 | | |
| NOR | 1 | — | | |
| EQUAL | 1 | | | |
| W = C ⊗ K | 1 | 1 | 1 | 1 |

There is an additional combination of 'carry' and 'borrow' generating functions that will enable reversible coding/decoding combined with an EQUAL function. The two functions 'sb4' and 'sb5' are determined by the following truth tables.

| sb4 | 0 | 1 |
|---|---|---|
| 0 | 0 | 1 |
| 1 | 1 | 1 |

| sb5 | 0 | 1 |
|---|---|---|
| 0 | 1 | 1 |
| 1 | 0 | 1 |

It should be clear that these additional functions are the inverse of the NOR function (which is the OR function) and of 'sb3'.

For purposes of definition, one may assume reversible coding using only reversible functions and no carry or borrow function to be a ripple adder based scheme wherein the carry or borrow function 'scb' is determined by the all 0 state truth table, sometimes called the "NEVER" function.

Ripple Adder Scheme Coding/Decoding for N=3

As a further aspect of the present invention reversible ripple adder based coding of 3-state symbols, using a reversible function to determine a residue based symbol, combining such symbol with a carry or borrow type symbol to create a coded symbol, is provided.

There are several reversible functions and multiple related carry and borrow functions that will enable reversible ripple adder method coding and decoding of words of 3-state symbols, a word having two or more symbols. There are multiple 'universal' 3-state functions that enable coding/decoding of words unrestricted to the number of symbols in a word. There are also functions that apply only to words with a limited number of symbols.

The first reversible coding function that may be investigated is the modulo-3 addition. This is not a self-reversing function. It has as its reversing function the modulo-3 subtraction, which is a non-commutative switching function. The truth tables of the modulo-3 adder (add3) and the modulo-3 subtraction (min3) are provided in the following tables.

| add3 | 0 | 1 | 2 |
|---|---|---|---|
| 0 | 0 | 1 | 2 |
| 1 | 1 | 2 | 0 |
| 2 | 2 | 0 | 1 |

| min3 | 0 | 1 | 2 |
|---|---|---|---|
| 0 | 0 | 2 | 1 |
| 1 | 1 | 0 | 2 |
| 2 | 2 | 1 | 0 |

Because 'add3' and 'min3' are different 3-state switching functions the 'carry' is now connected to 'add3' and the 'borrow' is connected to 'min3'. The 3-state functions to create 'carry' is 'scc' and the one to create the 'borrow' is 'scb'. The truth tables of 'scc' and 'scb' are provided in the following tables.

| scc | 0 | 1 | 2 |
|---|---|---|---|
| 0 | 0 | 0 | 0 |
| 1 | 0 | 0 | 1 |
| 2 | 0 | 1 | 1 |

| scb | 0 | 1 | 2 |
|---|---|---|---|
| 0 | 0 | 1 | 1 |
| 1 | 0 | 0 | 1 |
| 2 | 0 | 0 | 0 |

An example of coding and decoding using the above functions are provided in the following tables, wherein the codeword W=[1 1 1 1] and the keyword is K=[2 0 2 0].

|  | W | | | |
|---|---|---|---|---|
|  | 1 | 1 | 1 | 1 |
|  | K | | | |
|  | 2 | 0 | 2 | 0 |
| add3 | 0 | 1 | 0 | 1 |
| scc | 0 | 1 | 0 | — |
| add3 | 0 | 2 | 0 | |
| scc | 0 | 0 | — | |
| add3 | 0 | 2 | | |
| scc | 0 | — | | |
| add3 | 0 | | | |
| C = W ⊕ K | 0 | 2 | 0 | 1 |

Decoding of C=[0 2 0 1] with K=[2 0 2 0] is provided in the following table.

|  | C | | | |
|---|---|---|---|---|
|  | 0 | 2 | 0 | 1 |
|  | K | | | |
|  | 2 | 0 | 2 | 0 |
| min3 | 1 | 2 | 1 | 1 |
| scb | 0 | 1 | 0 | — |
| min3 | 1 | 1 | 1 | |
| scb | 0 | 0 | — | |
| min3 | 1 | 1 | | |
| scb | 0 | — | | |
| min3 | 1 | | | |
| W = C ⊗ K | 1 | 1 | 1 | 1 |

There are several other combinations of 'carry' function 'scc' with 'add3' and 'borrow' function 'scb' with 'min3' that create corresponding reversible pairs of coder/decoder. One such combination 'scc1'/'scb1' is provided in the following table.

| scc1 | 0 | 1 | 2 |
|---|---|---|---|
| 0 | 0 | 0 | 0 |
| 1 | 0 | 1 | 1 |
| 2 | 0 | 1 | 0 |

| scb1 | 0 | 1 | 2 |
|---|---|---|---|
| 0 | 0 | 1 | 1 |
| 1 | 0 | 0 | 0 |
| 2 | 0 | 1 | 0 |

A coding/decoding example W=[1 1 1 1] and K=[1 0 1 0] using the above functions 'scc'/'scb' is provided in the following tables.

|  | W | | | |
|---|---|---|---|---|
|  | 1 | 1 | 1 | 1 |
|  | K | | | |
|  | 1 | 0 | 1 | 0 |
| add3 | 2 | 1 | 2 | 1 |
| scc1 | 0 | 1 | 0 | — |
| add3 | 2 | 2 | 2 | |
| scc1 | 1 | 0 | — | |
| add3 | 0 | 2 | | |
| scc1 | 0 | — | | |
| add3 | 0 | | | |
| C = W ⊕ K | 0 | 2 | 2 | 1 |

|  | C | | | |
|---|---|---|---|---|
|  | 0 | 2 | 2 | 1 |
|  | K | | | |
|  | 1 | 0 | 1 | 0 |
| min3 | 2 | 2 | 1 | 1 |
| scb1 | 0 | 1 | 0 | — |
| min3 | 2 | 1 | 1 | |
| scb1 | 1 | 0 | — | |
| min3 | 1 | 1 | | |
| scb1 | 0 | — | | |
| min3 | 1 | | | |
| W = C ⊗ K | 1 | 1 | 1 | 1 |

Another combination of 'scc'/'scb' is:

| scc2 | 0 | 1 | 2 |
|---|---|---|---|
| 0 | 0 | 1 | 1 |
| 1 | 0 | 1 | 0 |
| 2 | 0 | 0 | 0 |

| scb2 | 0 | 1 | 2 |
|---|---|---|---|
| 0 | 0 | 0 | 0 |
| 1 | 0 | 1 | 0 |
| 2 | 0 | 1 | 1 |

Yet another combination is:

| scc2 | 0 | 1 | 2 |
|---|---|---|---|
| 0 | 1 | 1 | 1 |
| 1 | 1 | 0 | 0 |
| 2 | 1 | 0 | 1 |

| scb2 | 0 | 1 | 2 |
|---|---|---|---|
| 0 | 1 | 0 | 0 |
| 1 | 1 | 1 | 1 |
| 2 | 1 | 0 | 1 |

There are more of these combinations connected to add3 and min3. These combinations can easily be found by applying a computer program and using for instance different words of 6 3-state symbols with a key of 6 3-state symbols and identifying the functions that perform the correct coding and decoding. For instance the reversible 3-state function add31 has a reverse min31 of which the truth tables are provided in the following tables.

| add31 | 0 | 1 | 2 |
|---|---|---|---|
| 0 | 2 | 0 | 1 |
| 1 | 0 | 1 | 2 |
| 2 | 1 | 2 | 0 |

| min31 | 0 | 1 | 2 |
|---|---|---|---|
| 0 | 1 | 0 | 2 |
| 1 | 2 | 1 | 0 |
| 2 | 0 | 2 | 1 |

One combination of 'scc'/'scb' to 'add31'/'min31' is provided in the following truth tables.

| scc3 | 0 | 1 | 2 |
|---|---|---|---|
| 0 | 1 | 0 | 1 |
| 1 | 0 | 0 | 0 |
| 2 | 1 | 0 | 0 |

| scb3 | 0 | 1 | 2 |
|---|---|---|---|
| 0 | 0 | 0 | 0 |
| 1 | 1 | 0 | 1 |
| 2 | 1 | 0 | 0 |

In addition to functions 'scc' and 'scb' only having carry and borrow transitions of state 0 and state 1 there are also functions having other state transitions. For instance carry and borrow transitions of state 1 and state 2 are also possible. Using reversible functions 'add31' and 'min31' in a ripple adder type scheme one may apply for coding and decoding the functions 'scc4' for carry generation and 'scb4' for borrow generation of which the truth tables are provided in the following tables.

| scc3 | 0 | 1 | 2 |
|---|---|---|---|
| 0 | 2 | 2 | 2 |
| 1 | 1 | 2 | 2 |
| 2 | 1 | 2 | 1 |

| scb3 | 0 | 1 | 2 |
|---|---|---|---|
| 0 | 1 | 2 | 1 |
| 1 | 1 | 2 | 2 |
| 2 | 2 | 2 | 2 |

A coding/decoding example using W=[1 1 1 1] and K=[2 0 2 0] with these functions is provided in the following tables.

| | W | | | |
|---|---|---|---|---|
| | 1 | 1 | 1 | 1 |
| | K | | | |
| | 2 | 0 | 2 | 0 |
| add31 | 2 | 0 | 2 | 0 |
| scc3 | 1 | 2 | 1 | — |
| add31 | 2 | 1 | 2 | |
| scc3 | 2 | 2 | — | |
| add31 | 0 | 2 | | |
| scc3 | 2 | — | | |
| add31 | 1 | | | |
| $C = W \oplus K$ | 1 | 2 | 2 | 0 |

| | C | | | |
|---|---|---|---|---|
| | 1 | 2 | 2 | 0 |
| | K | | | |
| | 2 | 0 | 2 | 0 |
| min31 | 0 | 0 | 1 | 1 |
| scb3 | 2 | 2 | 1 | — |
| min31 | 2 | 2 | 1 | |
| scb3 | 1 | 2 | — | |
| min31 | 2 | 1 | | |
| scb3 | 2 | — | | |
| min31 | 1 | | | |
| $W = C \otimes K$ | 1 | 1 | 1 | 1 |

There are at least 6 different combinations of 'add3' and 'min3' and over 20 different combinations of 'scc' and 'scb'. Accordingly one can reversibly code a plurality of words of 3-state symbols, a word having at least 2 3-state symbols, into the same number of codewords, each codeword having the same number of symbols it was coded from, by applying to a word a ripple adder type coder, and applying at least 2 different combinations of reversible functions and carry generating functions. This means that of course at least 2 words have to be coded, etc. The inventor is not aware of this ever done before. If that however is not the case then at least 3 combinations are believed to be novel. If that is not the case then at least 4 or 5 combinations are believed to be novel. This applies for any state n>2 and for n>2. A combination may or may not include the trivial case wherein the carry function is the NEVER function.

In accordance with an aspect of the present invention one may also code a word which consists of a limited number of 3-state symbols in a reversible manner with the ripple adder method. In those cases the method may not work for words with a greater number of symbols. For instance using the functions 'add3' and 'min3' one may code a 3-symbol word generating a carry by 3-state function 'scc4' and generating in decoding a borrow by 3-state function 'scb4' of which the truth tables are provided by the following tables.

| scc4 | 0 | 1 | 2 |
|---|---|---|---|
| 0 | 0 | 0 | 0 |
| 1 | 0 | 1 | 2 |
| 2 | 0 | 2 | 1 |

| scb4 | 0 | 1 | 2 |
|---|---|---|---|
| 0 | 0 | 2 | 2 |
| 1 | 0 | 0 | 1 |
| 2 | 0 | 1 | 0 |

Another combination for 3-symbol 3-state words is with the functions 'add3' and 'min3' is with 'scc5' and 'scb5' which are provided in the following table.

| scc4 | 0 | 1 | 2 |
|---|---|---|---|
| 0 | 0 | 0 | 0 |
| 1 | 0 | 2 | 1 |
| 2 | 0 | 1 | 2 |

| scb4 | 0 | 1 | 2 |
|---|---|---|---|
| 0 | 0 | 1 | 1 |
| 1 | 0 | 0 | 2 |
| 2 | 0 | 2 | 0 |

The following combination works for at least 8 3-state symbols and appear not to be limited to the number of symbols in a word. They again apply to 'add3'/'min3'.

| scc5 | 0 | 1 | 2 |
|---|---|---|---|
| 0 | 0 | 1 | 0 |
| 1 | 0 | 2 | 2 |
| 2 | 0 | 0 | 1 |

| scb5 | 0 | 1 | 2 |
|---|---|---|---|
| 0 | 0 | 1 | 0 |
| 1 | 0 | 2 | 2 |
| 2 | 0 | 0 | 1 |

For instance the word W=[1 1 1 1 1 1 1 1] added to the word K=[1 1 1 0 0 2 2 2] with the carry/borrow solution will generate [1 2 1 0 0 2 2 0], which can be correctly decoded.

Another combination is provided by the following table which will work again with 'add3'/'min3'.

| scc6 | 0 | 1 | 2 |
|---|---|---|---|
| 0 | 0 | 1 | 1 |
| 1 | 0 | 1 | 2 |
| 2 | 0 | 2 | 2 |

| scb6 | 0 | 1 | 2 |
|---|---|---|---|
| 0 | 0 | 2 | 2 |
| 1 | 0 | 1 | 2 |
| 2 | 0 | 1 | 1 |

This combination using the same W and K as above will generate [0 2 1 0 0 0 2 0] and will decode correctly.

The strength of the code may come from the coding function add3 and the randomness of the key. However if both are for some reason compromised then the carry function creates additional randomness.

It is known in the art of ripple adders that calculating a carry or borrow in an addition may slow down the process of calculating a sum. Especially when a carry 'ripples' through all digits of a calculation one has to go through the full cycle of individual steps. In many cases such a ripple may not occur and one may stop calculations early. It is often advantageous to predict if a ripple will occur. If that is not the case one may stop calculations in an early stage, thus potentially saving time. This carry predicting is a well known process and comes in different forms. One known method is the Carry Look Ahead method. Application of these predictive methods can also be developed for the coding and decoding processes described as different aspects of the current invention and are fully contemplated. These carry predictive and look ahead methods do not change the coding and decoding methods as provided herein, but can make them faster, especially if one uses words with a significant number of symbols.

Ripple Adder Based Coding/Decoding for N=4

As illustrative examples also coding/decoding functions in a ripple adder scheme will be provided for the 4-state case.

First some 4-state carry and borrow functions will be shown for the modulo-4 addition and subtraction, of which the truth tables are shown in the following table.

| add4 | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

| min4 | 0 | 1 | 2 | 3 |
|---|---|---|---|---|
| 0 | 0 | 3 | 2 | 1 |
| 1 | 1 | 0 | 3 | 2 |
| 2 | 2 | 1 | 0 | 3 |
| 3 | 3 | 2 | 1 | 0 |

The known carry and borrow functions sc4 and sb4 are provided in the following truth tables.

| sc4 | 0 | 1 | 2 | 3 |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 1 | 1 | 1 |

| sb4 | 0 | 1 | 2 | 3 |
|---|---|---|---|---|
| 0 | 0 | 1 | 1 | 1 |
| 1 | 0 | 0 | 1 | 1 |
| 2 | 0 | 0 | 0 | 1 |
| 3 | 0 | 0 | 0 | 0 |

Another combination of carry and borrow functions sc41 and sb41 that will code and decode a word is provided in the following table.

| sc41 | 0 | 1 | 2 | 3 |
|---|---|---|---|---|
| 0 | 0 | 0 | 0 | 0 |
| 1 | 0 | 1 | 1 | 1 |
| 2 | 0 | 1 | 1 | 0 |
| 3 | 0 | 1 | 0 | 0 |

| sb41 | 0 | 1 | 2 | 3 |
|---|---|---|---|---|
| 0 | 0 | 1 | 1 | 1 |
| 1 | 0 | 0 | 0 | 0 |
| 2 | 0 | 1 | 0 | 0 |
| 3 | 0 | 1 | 1 | 0 |

As an example the word W=[1 1 1 1] will be coded with key K=[2 0 2 0] using add4 with sc41 and decoded with min4 and sb41.

|  | W |  |  |  |
|---|---|---|---|---|
|  | 1 | 1 | 1 | 1 |
|  | K |  |  |  |
|  | 2 | 0 | 2 | 0 |
| add4 | 3 | 1 | 3 | 1 |
| sc41 | 0 | 1 | 0 | — |
| add4 | 3 | 2 | 3 |  |
| sc41 | 1 | 0 | — |  |
| add4 | 0 | 2 |  |  |
| sc41 | 0 | — |  |  |
| add4 | 0 |  |  |  |
| C = W ⊕ K | 0 | 2 | 3 | 1 |

|  | C |  |  |  |
|---|---|---|---|---|
|  | 0 | 2 | 3 | 1 |
|  | K |  |  |  |
|  | 2 | 0 | 2 | 0 |
| min4 | 2 | 2 | 1 | 1 |
| sb41 | 0 | 1 | 0 | — |
| min4 | 2 | 1 | 1 |  |
| scb41 | 1 | 0 | — |  |
| min4 | 1 | 1 |  |  |
| scb41 | 0 | — |  |  |
| min4 | 1 |  |  |  |
| W = C ⊗ K | 1 | 1 | 1 | 1 |

Another combination is provided by add4 with sc42 for coding and min4 and sb42. Truth tables are provided in the following table.

| sc42 | 0 | 1 | 2 | 3 |
|---|---|---|---|---|
| 0 | 1 | 1 | 1 | 2 |
| 1 | 1 | 1 | 2 | 2 |
| 2 | 1 | 2 | 2 | 2 |
| 3 | 1 | 1 | 1 | 1 |

| sb42 | 0 | 1 | 2 | 3 |
|---|---|---|---|---|
| 0 | 1 | 1 | 2 | 2 |
| 1 | 1 | 1 | 1 | 2 |
| 2 | 1 | 1 | 1 | 1 |
| 3 | 1 | 2 | 2 | 2 |

As before one may also use other reversible functions for instance by transposing the columns in add4 into add41 and matching add41 with min41. The truth tables are provided in the following table.

| add41 | 0 | 1 | 2 | 3 |
|---|---|---|---|---|
| 0 | 3 | 1 | 2 | 0 |
| 1 | 0 | 2 | 3 | 1 |
| 2 | 1 | 3 | 0 | 2 |
| 3 | 2 | 0 | 1 | 3 |

| min41 | 0 | 1 | 2 | 3 |
|---|---|---|---|---|
| 0 | 1 | 3 | 2 | 0 |
| 1 | 2 | 0 | 3 | 1 |
| 2 | 3 | 1 | 0 | 2 |
| 3 | 0 | 2 | 1 | 3 |

Another combination is provided by add41 with sc43 for coding and min41 and sb43. Truth tables are provided in the following table.

| sc42 | 0 | 1 | 2 | 3 |
|---|---|---|---|---|
| 0 | 3 | 2 | 2 | 2 |
| 1 | 3 | 2 | 3 | 2 |
| 2 | 3 | 3 | 3 | 2 |
| 3 | 2 | 2 | 2 | 2 |

| sb42 | 0 | 1 | 2 | 3 |
|---|---|---|---|---|
| 0 | 3 | 2 | 3 | 2 |
| 1 | 3 | 2 | 2 | 2 |
| 2 | 2 | 2 | 2 | 2 |
| 3 | 3 | 3 | 3 | 2 |

There are in fact many more different combinations that will code and reversibly decode.

A somewhat special case for n=4 and for all n being $2^p$ is that next to a modulo-n adder one often uses an adder over GF(n) which is different from the modulo-n adder for $n=2^p$. The adder over GF($n=2^p$) is a self-reversing function and the addition and subtraction have identical truth tables, which are provided in the following table.

| add_gf(4) | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| min_gf(4) | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

Two sets of carry and borrow generating functions that enable coding and reversible decoding with add_gf4 are provided in the following tables.

| sc43 | 0 | 1 | 2 | 3 |
|---|---|---|---|---|
| 0 | 0 | 0 | 1 | 0 |
| 1 | 0 | 0 | 0 | 1 |
| 2 | 0 | 1 | 0 | 1 |
| 3 | 0 | 1 | 1 | 0 |

| sb43 | 0 | 1 | 2 | 3 |
|---|---|---|---|---|
| 0 | 0 | 0 | 0 | 0 |
| 1 | 0 | 0 | 1 | 1 |
| 2 | 0 | 1 | 1 | 1 |
| 3 | 0 | 1 | 0 | 0 |

| sc44 | 0 | 1 | 2 | 3 |
|---|---|---|---|---|
| 0 | 0 | 0 | 0 | 1 |
| 1 | 0 | 0 | 1 | 0 |
| 2 | 0 | 1 | 0 | 0 |
| 3 | 0 | 1 | 1 | 1 |

| sb44 | 0 | 1 | 2 | 3 |
|---|---|---|---|---|
| 0 | 0 | 0 | 0 | 1 |
| 1 | 0 | 0 | 1 | 0 |
| 2 | 0 | 1 | 0 | 0 |
| 3 | 0 | 1 | 1 | 1 |

The combination using sc44 and sb44 stands out because these are identical functions. An example of coding and decoding with the identical functions is provided in the following table.

| | W | | | |
|---|---|---|---|---|
| | 3 | 3 | 3 | 3 |
| | | K | | |
| | 2 | 3 | 2 | 3 |
| add_gf(4) | 1 | 0 | 1 | 0 |
| sc44 | 1 | 1 | 1 | |
| add_gf(4) | 0 | 1 | 0 | |
| sc44 | 0 | 0 | | |
| add_gf(4) | 0 | 1 | | |
| sc44 | 0 | | | |
| add_gf(4) | 0 | | | |
| C = W ⊕ K | 0 | 1 | 0 | 0 |

| | C | | | |
|---|---|---|---|---|
| | 0 | 1 | 0 | 0 |
| | | K | | |
| | 2 | 3 | 2 | 3 |
| min_gf(4) | 2 | 2 | 2 | 3 |
| sb44 | 0 | 0 | 1 | — |
| min_gf(4) | 2 | 2 | 3 | |
| scb44 | 0 | 1 | — | |
| min_gf(4) | 2 | 3 | | |
| scb44 | 1 | — | | |
| min_gf(4) | 3 | | | |
| W = C ⊗ K | 3 | 3 | 3 | 3 |

There are actually several other combinations of identical 'carry'/'borrow' 4-state functions that will work with add_gf(4)/min_gf(4). One other example is provided in the following table.

| sc45 | 0 | 1 | 2 | 3 |
|---|---|---|---|---|
| 0 | 3 | 3 | 1 | 1 |
| 1 | 3 | 3 | 3 | 3 |
| 2 | 3 | 1 | 1 | 3 |
| 3 | 3 | 1 | 3 | 1 |

| sb45 | 0 | 1 | 2 | 3 |
|---|---|---|---|---|
| 0 | 3 | 3 | 1 | 1 |
| 1 | 3 | 3 | 3 | 3 |
| 2 | 3 | 1 | 1 | 3 |
| 3 | 3 | 1 | 3 | 1 |

Ripple Adder Based Coding/Decoding for N>4

It is easy to see that the additional borrow and carry functions can be created by applying an n-state reversible inverter to earlier established borrow and carry functions.

Ripple Adder Based Coding/Decoding for N>4

It should be clear for those skilled in the art that one can extend the methods and apparatus provided herein as an aspect of the present invention can be implemented for n>4 also. It is easy to generate different n-state coders/decoders based on radix-n adders and their radix-n carry combined with the corresponding radix-n subtractions. variants on the coders/decoders and their functions can be created by interchanging at least two columns of a truth table of a reversible function and a matching non-reversible function and applying the same interchanging of columns to the functions involved in the corresponding ripple adder scheme decoder.

Limited Ripple Generation

Using a full ripple adder/subtraction approach on a p n-state symbol word as provided herein, requires executing 2p+1 steps and may create latency. One solution for reducing latency is to apply a carry look-ahead type operation. However this may still require significant circuitry. One solution is to limit the size of the word. For instance a long key, which is usually a representation of a large prime number, can be segmented in smaller words. In some cases one would still like to execute coding and decoding in a streaming fashion, rather than as a block coder.

In accordance with a further aspect of the present invention, coding with a carry and reversible decoding with a borrow can be performed by limiting the depth of the carry and borrow function. The following table shows one possible implementation of such an approach. The depth is provided by the maximum number of carry calculations for determining a coded symbol. The below scheme has a depth of 1.

| W | c6 | c5 | c4 | c3 | c2 | c1 |
|---|----|----|----|----|----|----|
| K | d6 | d5 | d4 | d3 | d2 | d1 |
| addn | c61 | c51 | c41 | c31 | c21 | c11 |
| carn | d61 | d51 | d41 | d31 | d21 | — |
| C | c66 | c55 | c44 | c33 | c22 | c11 |

Herein for instance $d21=c1$ carn $d1$ generates a carry (or a borrow) from previous inputs. And $c21=c2$ addn $d2$ is a reversible operation which could be a modulo-n addition. The final digit in a position is determined by the reversible combination of $c21$ and $d21$. This approach applies to every digit, except for the first digit as there is no carry or borrow to be generated. One may of course start coding with an assumption of a 'starting' carry, usually called 'carry-in', as long as that assumption is extended to the decoder. This will change the depth to 2. There is no extended ripple and the determination of a digit has only to wait for a previous input, and not for a previous carry or borrow. Using the previous input to determine a carry is just one example, other orders of input for determining a carry and a borrow can be applied.

In order to increase security one may add a preset carry to the first digit that is being processed. One may do that without or with ripple.

Most cases will be fairly simple functions, wherein an extra state is provided when the key has a certain state. For instance the two binary carry/borrow functions that will achieve such coding/decoding with the XOR are provided in the following tables.

| carn1 | 0 | 1 |
|-------|---|---|
| 0 | 0 | 1 |
| 1 | 0 | 1 |

| born1 | 0 | 1 |
|-------|---|---|
| 0 | 0 | 1 |
| 1 | 0 | 1 |

| carn2 | 0 | 1 |
|-------|---|---|
| 0 | 1 | 0 |
| 1 | 1 | 0 |

| born2 | 0 | 1 |
|-------|---|---|
| 0 | 1 | 0 |
| 1 | 1 | 0 |

Interesting carry/borrow functions are provided in cases wherein reversible additions over $GF(2^p)$ are used. In the earlier provided 4-state case two sets of carry/borrow functions that will work with the method of limited ripple generation using add_gf4 are provided in the following table.

| car41 | 0 | 1 | 2 | 3 |
|-------|---|---|---|---|
| 0 | 0 | 0 | 0 | 0 |
| 1 | 0 | 0 | 0 | 0 |
| 2 | 1 | 1 | 0 | 1 |
| 3 | 1 | 1 | 0 | 1 |

| bor41 | 0 | 1 | 2 | 3 |
|-------|---|---|---|---|
| 0 | 0 | 0 | 0 | 1 |
| 1 | 0 | 0 | 0 | 1 |
| 2 | 1 | 1 | 0 | 0 |
| 3 | 1 | 1 | 0 | 0 |

| car42 | 0 | 1 | 2 | 3 |
|-------|---|---|---|---|
| 0 | 0 | 0 | 0 | 0 |
| 1 | 0 | 0 | 0 | 0 |
| 2 | 0 | 1 | 1 | 1 |
| 3 | 0 | 1 | 1 | 1 |

| bor42 | 0 | 1 | 2 | 3 |
|-------|---|---|---|---|
| 0 | 0 | 0 | 1 | 1 |
| 1 | 0 | 0 | 1 | 1 |
| 2 | 0 | 1 | 0 | 0 |
| 3 | 0 | 1 | 0 | 0 |

One may make a coder/decoder combination more complex by involving another layer of carry and borrow symbols.

This means that a scheme involves two layers of carry calculation, or a depth of 2. Such a scheme is shown in the following table.

| W    | c6  | c5  | c4  | c3  | c2  | c1  |
|------|-----|-----|-----|-----|-----|-----|
| K    | d6  | d5  | d4  | d3  | d2  | d1  |
| addn | c61 | c51 | c41 | c31 | c21 | c11 |
| carn | d61 | d51 | d41 | d31 | d21 | —   |
| addn | c62 | c52 | c42 | c32 | c22 |     |
| carn | d62 | d52 | d42 | d32 | —   |     |
| C    | c66 | c55 | c44 | c33 | c22 | c11 |

Using the GF(4) adder as reversible function the following combination is an examples of the matching non-reversible function.

| car43 | 0 | 1 | 2 | 3 |
|-------|---|---|---|---|
| 0     | 0 | 0 | 0 | 1 |
| 1     | 0 | 0 | 0 | 1 |
| 2     | 0 | 0 | 1 | 1 |
| 3     | 0 | 0 | 1 | 1 |

| bor43 | 0 | 1 | 2 | 3 |
|-------|---|---|---|---|
| 0     | 0 | 0 | 1 | 1 |
| 1     | 0 | 0 | 1 | 1 |
| 2     | 0 | 0 | 0 | 1 |
| 3     | 0 | 0 | 0 | 1 |

As a further aspect of the present invention one may implement the herein provided ripple generating reversible combination of functions as a function in an n-state Linear Feedback Shift Register (LFSR) for $n \geq 2$ and for $n>2$. LFSRs are known and appear in Fibonacci and in Galois configuration. FIG. 1 shows an LFSR in Fibonacci configuration with shift register elements sr1, sr2 and sr3; functions 102, 106 and 107; one feedback tap 105 is specifically identified. The LFSR 100 is identified as the circuit in diagram to the right of line 101. The LFSR 100 has as its input 104 and as output 103.

The diagram of FIG. 1 represents an n-state scrambler which was extensively explained in co-pending U.S. application Ser. No. 10/935,960, filed on Sep. 8, 2004, which is incorporated herein by reference. Each of the n-state functions 106 and 107 in the LFSR may be reversible or non-reversible. However for the scrambler of FIG. 1 to be corresponding to a descrambler of which a diagram is provided in FIG. 2 having the same LFSR 100 as FIG. 1. For the descrambler to correspond to the scrambler of FIG. 1 the function 109 ds3 should be the reverse of function 102 sc3. In accordance with an aspect of the present invention signals processed in the scrambling function, descrambling function and the LFSR can be words of 2 or more n-state symbols. The functions in the LFSR which may be a combination of functions may perform any multi-state, multi symbol processing, including the ones provided herein as aspects of the present invention. This is believed to be novel. For the scrambling/descrambling to work the functions sc3 and ds3 which may be a combination of functions must be able to process 2 or more n-state symbols in such a way that when sc3 is assumed to be the coder then ds3 is the decoder and has to reverse the working of sc3. It is to be understood that in the processing of words of n-state symbols all elements of the LFSR and the scrambling and descrambling function are able to process multi-symbol words.

Figure 2:
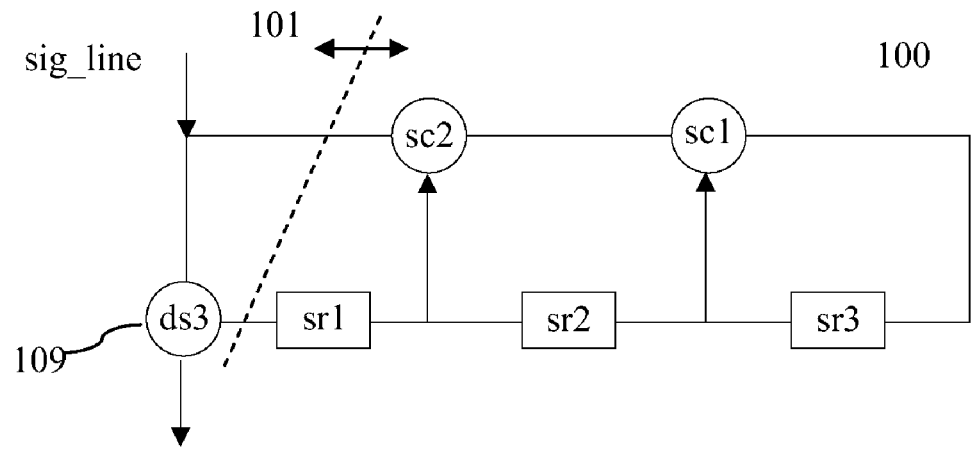
FIG. 2 is a diagram of an n-state Fibonacci LFSR based descrambler in accordance with an aspect of the present invention.
Figure 3:
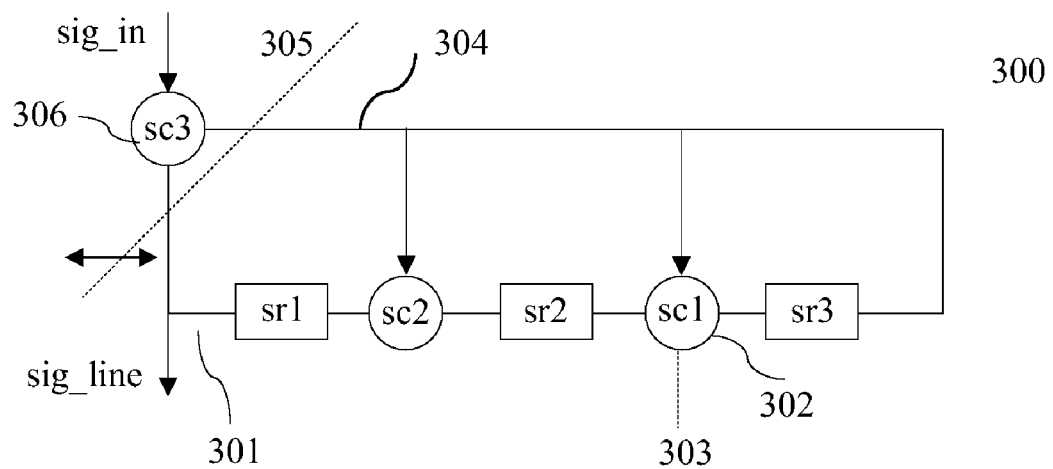
FIG. 3 is a diagram of an n-state Galois LFSR based scrambler in accordance with an aspect of the present invention.
Figure 4:
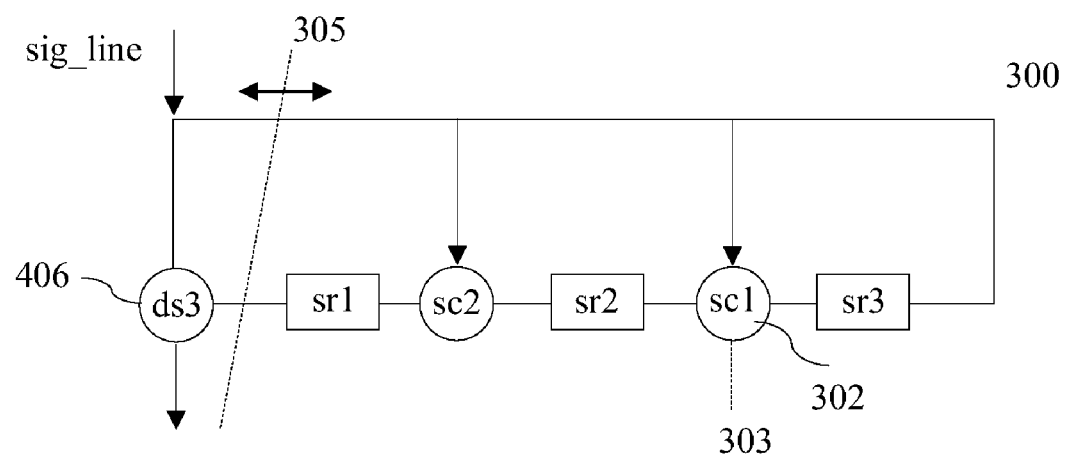
FIG. 4 is a diagram of an n-state Galois LFSR based descrambler in accordance with an aspect of the present invention.

FIG. 3 shows a diagram of an LFSR based scrambler of words of 2 or more n-state symbols in Galois configuration. The diagram to the right of line 305 shows the Galois LFSR 300 with input 301 and output 304. FIG. 4 shows the descrambler corresponding to the scrambler of FIG. 3 in Galois configuration. The same conditions for functions apply to the scrambler/descrambler of FIGS. 3 and 4 as to the ones of FIGS. 1 and 2 regarding processing of words of 2 or more n-state symbols. It is noted that while the descrambler of FIG. 2 is self-synchronizing the one of FIG. 4 is not.

The LFSR devices that apply the coding scheme may apply reversible or non-reversible coding inside the LFSR. One may apply an external keyword to a device such as 302 in FIGS. 3 and 4. The device in that case may no longer execute an n-state function sc1, but rather for instance implements a ripple adder coding scheme as provided herein generating a 'sum' and a 'carry' type symbol or set of symbols. A keyword may be provided on an input 303. The aspect of LFSRs with devices that are controlled externally is disclosed in U.S. patent application Ser. No. 12/323,070 filed on Nov. 25, 2008, which is incorporated herein by reference in its entirety. A device inside the LFSR performing a ripple adder coding scheme may be reversible or non-reversible. A device such as device 306 in FIG. 3 may also implement a ripple adder coding scheme. Because FIG. 3 shows a scrambler, and FIG. 4 shows a descrambler, device 306 should implement a reversible coding scheme that can be reversed by device 406 in FIG. 4. The to be coded word is provided on a first input of device 306 as sig_in and the keyword may be the word provided on a second input of 306 by the LFSR. Device 406 reverses the coding scheme. It is noted that in case of the LFSR processing words of symbols, instead of symbols all elements, including the shift register elements are enabled to process words of symbols.

Figure 5:
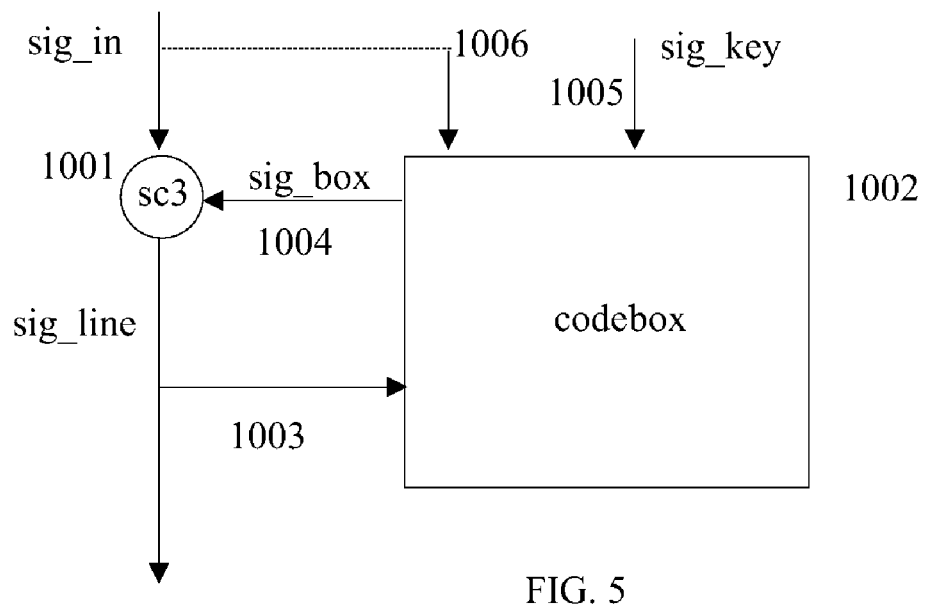
FIG. 5 is a diagram of a reversible coder with a codebox in accordance with an aspect of the present invention.

The use of multi-symbol n-state words as provided herein is not limited to block-codes or LFSRs. The methods provided herein may also be used in reversible coders/decoders of which a diagram is provided in FIGS. 5 and 6. While FIG. 5 is called the coder and FIG. 6 the decoder, the roles may be reversed. The coder is comprised of a scrambling function 1001 sc3 which is inputted with a to be scrambled signal and on input 1004 with a signal sig_box coming from codebox 1002. Codebox 1002 may be provided with a key signal sig_key on 1005; also the input signal may be provided on 1006 and a scrambled signal is provided on 1003, which is a feedback signal. The use of a feedback signal on 1003 requires that an initial state is known and used in the codebox. All functions in the codebox 1002 are instances of single n-state functions or a combination of n-state functions which may be reversible or non-reversible, and should be able to process a word of 2 or more n-state symbols. The scrambling function sc3 in 1001 also is able to process words of 2 or more n-state variables and should be reversible. Thus sc3 may implement one of the reversible ripple methods provided herein as aspects of the present invention.

Figure 6:
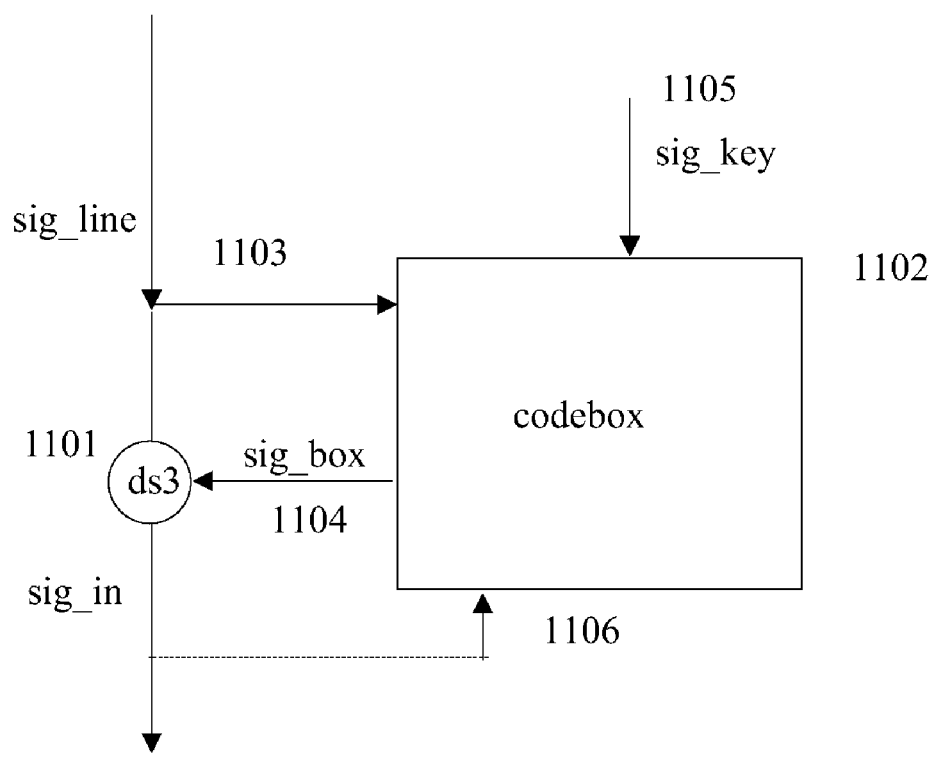
FIG. 6 is a diagram of a reversible decoder with a codebox in accordance with an aspect of the present invention.

FIG. 6 provides a diagram of the decoder corresponding to the coder of FIG. 5. Codebox 1102 is identical to codebox 1002. Input 1105 provides a signal with the key sig_key. Input 1006 provides as a feedback the output signal from descrambling function ds3. And input 1103 provides the coded signal. The coded signal is also provided to descrambling function ds3 in 1101. The descrambling function is also provided on 1104 with a signal from the codebox. The functions ds3 should reverse the functions sc3 in FIG. 6. All signals herein should then be words of 2 or more n-state symbols and all functions shown in the figures are assumed to be able to process the words as units. Accordingly each function is a plurality of functions, which may be identical or may contain different functions as described herein as aspects of the present invention.

The methods disclosed herein can be used in any reversible coder. For instance it can be applied in a scrambler as disclosed by Kuhlman et al. in U.S. Pat. No. 7,099,469 issued on Aug. 29, 2006 which is incorporated herein by reference. The methods can also be used in for instance the S-box of Feistel ciphers or Feistel networks.

Figure 7:
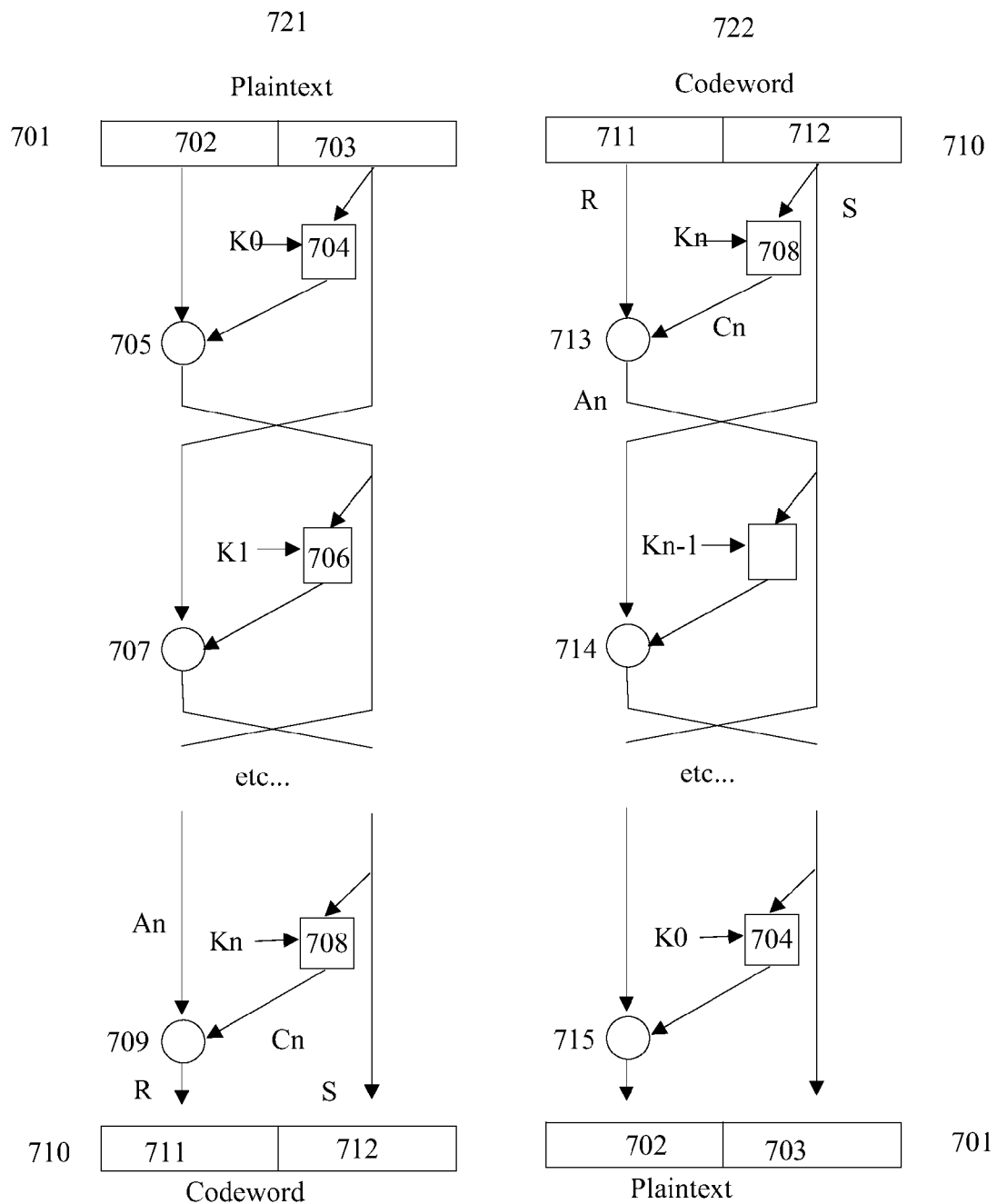
FIG. 7 is a diagram of a coding and decoding Feistel network in accordance with an aspect of the present invention.

The Feistel network is illustrated in FIG. 7. Herein 721 is the coding or ciphering network and 722 is the decoding or deciphering network. The order of use of 721 and 722 can be exchanged as long the one reverses the other. The working is well known to one of ordinary skill in the art, but will be briefly explained herein. A plaintext word 701 of 2p (with p≧1 or p>1) n-state symbols with n≧2 will be spilt into two parts 702 and 703 of n-state symbols. These words and their parts may be binary symbols. They may also be n-state symbols with n>2. They may also be n-state symbols which are represented as binary symbols. An n-state symbol may be represented by n-state signals to be processed by n-state switching functions. They also may be binary symbols represented by binary signals to be processed by binary switching functions. They may also be n-state symbols represented by binary signals that are processed by n-state switching functions that are implemented by binary switching technology. In the last case, signals and switching technology often represent symbols and functions over $GF(2^q)$ with q>1.

In 721 word 701 is spilt up in word 702 and 703. Word 703 is modified by an n-state function 704 against a word K0. The n-state functions implemented in 704, 706 and 708 may be reversible or non-reversible. They have as input a known signal such as a key word K0, K1, . . . Kn or apply some known confusion scheme. These functions have to be applied with the same corresponding key in the coder 721 and in reversed order in decoder 722. The n-state functions 705, 707 and 709 in coder 721 have to be reversible n-state functions and have to be applied in reversed order in their corresponding reversing function in 722. The n-state function may be commutative r non-commutative.

Assume that function 709 can be represented as sc1 and function 708 as sc2. Further assume that the reverse of function sc1 is function ds1. This can be illustrated by the expressions c=a sc1 b and a=c ds1 b. In general one applies the adder over $GF(2^n)$ as the reversible n-state function. This adder is self-reversing and commutative and can be implemented in binary logic by XOR functions.

The last stage of 721 can be expressed as Cn=S sc1 Kn and R=An sc2 Cn. The first stage of 722 has a function 713 which reverses sc2 and can be called ds2. The first stage of the decoder 722 can be expressed as Cn=S sc1 Kn and An=R ds2 Kn. This demonstrates that the decoder 722 reverses the coder 721. One has to make sure that the generated codeword 710 which is formed from 711 and 712 is entered in the proper way as the to be decoded codeword into decoder 722.

Figure 8:
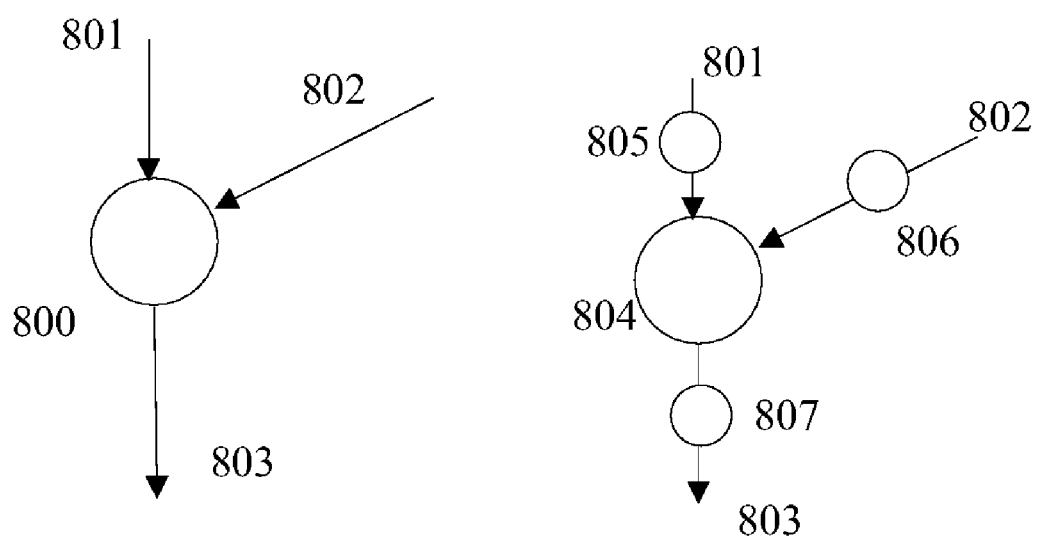
FIG. 8 is a diagram illustrating implementing n-state switching functions in accordance with an aspect of the present invention.

In accordance with an embodiment of the present invention a two input n-state function of FIG. 7 may be represented by an n by n truth table. If the function is reversible a column and/or a row of the truth table have to be a reversible n-state inverter. It is often fairly simple to use the adder over $GF(2^q)$ as a reversible function, because it is fairly easy to implement. One may modify the adder by providing n-state inverter at one or both of the inputs and/or by providing an n-state inverter at the output. An n-state inverter over $GF(2^q)$ can be implemented in binary logic for processing of words of q bits by using combinational binary circuitry, by switching outputs or by using a memory device. FIG. 8 shows in diagram an n-state switching device 800 implementing an n-state function with inputs 801 and 802 and output 803. One may implement such a function by using for instance a device 804 that implements an adder over $GF(2^q)$ with inverters 805 and 806 at the inputs and inverter 807 at the output that implements the function of 800. An inverter may be identity, which is a direct connection, which may be called a multiplier 1. This aspect is extensively explained by the inventor in for instance U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS which is incorporated herein by reference in its entirety.

For example, the device 800 may implement the 4-state function

|   | 0 | 1 | 2 | 3 |
|---|---|---|---|---|
| 0 | 3 | 1 | 0 | 2 |
| 1 | 1 | 3 | 2 | 0 |
| 2 | 0 | 2 | 3 | 1 |
| 3 | 2 | 0 | 1 | 3 |

The above function can be implemented by applying a 4-state adder over GF(4) with at the inputs the inverter 805 [0 1 2 3]→[3 1 0 2] and inverter 806 [0 1 2 3]→[0 2 3 1] and inverter 807 is [0 1 2 3]→[0 1 2 3], wherein input 801 determines the rows of a truth table In a further embodiment of the present invention one may use different reversible n-state functions in a Feistel network. In general the plaintext words that are being coded (and decoded) are part of a message that contains a plurality of plaintext words. In a further embodiment of the present invention one may dynamically change a function in a network in a controlled way as the coder receives plaintext words. Such changes may be controlled by a clock signal and by a list of possible functions that can be applied by the coder. A selected function, or series of functions may also be determined based on a state of the coder or on a state of one or more keywords.

In a further embodiment, one may apply as a reversible function a set of two functions that perform a ripple adder scheme. One may use a reversible scheme for the devices that require to be reversible. One may also apply non-reversible ripple adder schemes for the functions 704, 706 and 708. One may apply a broader range of carry functions than in the reversible scheme. In the non-reversible scheme one may apply for instance all of the n-states as a possible carry state. For instance, as a non-reversible 4-state ripple scheme one may apply the adder over GF(4) both as the adder part and the carry part. For instance, one may only calculate a carry once (or depth 1) to generate a codeword. The following example shows a result of adding plaintext [1 2 2 0 3] with keyword [2 3 0 3 1] by applying the adder over GF(4).

| plaintext | 1 | 2 | 2 | 0 | 3 |
|---|---|---|---|---|---|
| keyword | 2 | 3 | 0 | 3 | 1 |
| add | 3 | 1 | 2 | 3 | 2 |
| carry | 1 | 2 | 3 | 2 | — |
| result | 2 | 3 | 1 | 1 | 2 |

All functions herein can be physically implemented and applied. Functions can be created as custom circuits enabled to process n-state symbols. Circuits can also be known or novel binary circuits processors, computer systems or custom circuitry enabled to input, process and output n-state symbols. An n-state symbol itself may be represented as a single symbol, it may also be represented as a binary word. In the latter case a word of 2 or more n-state symbols for n>2 may be a word of 2 or more words of binary symbols. Symbols may be represented by the presence of an electrical, optical, mechanical, quantum-mechanical, bio-chemical, molecular phenomenon or by any phenomenon that can represent an n-state symbol. All circuits, systems, apparatus and processors that can implement and execute the methods disclosed herein may be designated as a processor.

The coding and decoding methods provided herein may be applied in computer devices, including computer systems, communication devices and systems, storage devices and systems and security applications. One such security application may be an application to identify a user of a system, which may be a financial system and may be for instance implemented in a credit card or an ATM card and/or the systems used to read such cards.

The coding and decoding methods and apparatus as provided herein may be running in real-time. They may act on signals or samples of signals in real-time. They may also be applied not in real-time.

The expressions herein perform a ripple adder like operations wherein an augend and an addend are processed to create a sum. The operation is actually not always a sum. What in the actual ripple adder is called a sum, may be called a codeword in the different aspects of the present invention. The augend then corresponds with a to be coded word. The addend may be a key. The codeword may be decoded to the original word that was coded by using the structure of the ripple adder that performs a subtraction. Herein the minuend corresponds with the codeword. The subtrahend is a keyword and the calculated difference corresponds with the original word.

The coding and decoding method provided herein as different aspects of the present invention all use a ripple adder scheme. A ripple adder scheme is well known to those skilled in the art of digital electronics. A known illustrative ripple adder scheme is in binary electronics. Determining an intermediate result comprises two steps: determining in a position a residue of two digits related to that position by using a first reversible logic function and determining a transitional digit or symbol which may be a carry or a borrow from two digits or symbols from different positions by using a first non-reversible function. A residue digit is considered to be a result digit if for a position no more transitional digits for a position can be generated. The process stops after the last result digit or symbol has been generated. In a ripple adder to determine a sum the digits have a value, and the scheme is processed from the least significant symbol to the most significant symbol. Also the final generated transitional symbol may occupy a new position as the new most significant digit. This digit is also known as the carry-out.

For coding a word of n-state symbols herein applying a ripple adder scheme will mean using the same process however without the limitation of moving from right to left and without generating a final symbol outside the original word as a most significant digit. The final symbol in a ripple adder to create a sum from adding two p symbol words may be a (p+1)th symbol, created by a transitional symbol such as a carry. In coding or decoding this (p+1)th symbol is not generated and may not be required. One may thus process the symbols in any order, only requiring that each symbol is processed only once. For illustrative purposes coding and decoding examples were shown moving from right to left. However other orders of processing may also be used. For decoding the same scheme and order as the coding process are used. However therein a second reversible function and a second non-reversible function may be used which are different from the functions in the coding ripple adder scheme to recover the original word.

It is to be understood that the position of a word as augend, addend, minuend or subtrahend are only important when functions applied are non-commutative. If a function is commutative then the roles of augend and addend and minuend and subtrahend are interchangeable and non-limiting.

In a coder using a ripple adder scheme the reversible function can be a radix-n modulo-n adder and the non-reversible function the radix-n carry function. The reverse of the reversible function can also be used as the reversible function in the ripple scheme. Accordingly the radix-n modulo-n subtraction function is a reversible function that can be used for coding, combined with the radix-n borrow function. The set of n-state reversible functions including the radix-n modulo-n adder is called the first set of reversible n-state functions. Furthermore it is easy to check that the function with a truth table that is modified from the radix-n modulo-n adder by changing positions of at least two columns of the truth table of the modulo-n adder is also a valid reversible function in a ripple adder scheme coder. Such a function is a radix-n function modified according to an n-state inverter is called an inverted radix-n adder.

The set of n-state reversible functions including the radix-n modulo-n adder of which each function in the set enables coding a word of n-state symbols according to a ripple adder scheme into a codeword that can be decoded with a corresponding ripple scheme decoder is called the standard adder set of n-state reversible functions.

The set of n-state reversible functions including the radix-n modulo-n subtraction of which each function in the set enables coding a word of n-state symbols according to a ripple adder scheme into a codeword that can be decoded with a corresponding ripple scheme decoder is called the standard subtraction set of n-state reversible functions.

The set of n-state reversible functions including an inverted radix-n modulo-n adder of which each function in the set enables coding a word of n-state symbols according to a ripple adder scheme into a codeword that can be decoded with a corresponding ripple scheme decoder is called the inverted standard adder set of n-state reversible functions.

In a coder using a ripple adder scheme, the non-reversible function can be a radix-n carry function, which for n=2 is the AND function, with the reversible function being the radix-n adder function. This n-state non-reversible function may be called the standard radix-n carry function. The non-reversible function corresponding with the standard carry for decoding can also be used in a ripple scheme coder as the non-reversible function in the ripple scheme with the radix-n subtraction as the reversible function. This non-reversible function may be called the standard radix-n borrow function. Accordingly, the radix-n modulo-n subtraction function is a reversible function that can be used for coding, combined with the standard radix-n borrow function in a ripple adder scheme that has a corresponding ripple scheme decoder.

Furthermore, it is easy to check that the function with a truth table that is modified from the radix-n modulo-n adder by changing positions of at least two columns of the truth table of the modulo-n adder is also a valid reversible function in a ripple adder scheme coder that has a corresponding ripple scheme decoder. Such a function is actually a radix-n adder modified according to an n-state inverter and is called an inverted radix-n adder. The non-reversible n-state function that is combined with the inverted radix-n adder in a ripple adder scheme that has a corresponding ripple scheme decoder is the standard radix-n carry function modified according an n-state inverter. Such a function is called an inverted standard radix-n carry function.

The set of n-state non-reversible functions including the standard radix-n carry function of which each function in the set enables coding a word of n-state symbols according to a ripple adder scheme into a codeword that can be decoded with a corresponding ripple scheme decoder is called the standard carry function set of n-state non-reversible functions.

The set of n-state non-reversible functions including the standard radix-n borrow function of which each function in the set enables coding a word of n-state symbols according to a ripple adder scheme into a codeword that can be decoded with a corresponding ripple scheme decoder is called the standard borrow function set of n-state non-reversible functions.

The set of n-state non-reversible functions including an inverted standard radix-n carry function of which each function in the set enables coding a word of n-state symbols according to a ripple adder scheme into a codeword that can be decoded with a corresponding ripple scheme decoder is called the inverted standard carry function set of n-state non-reversible functions.

Two's Complement Ripple Adder Scheme

It is known that one may perform a radix-n multi-symbol subtraction of a minuend and a subtrahend by generating the radix-n complement of the subtrahend and adding the complemented subtrahend to the minuend, further applying a carry-in to the least significant digit of the complemented subtrahend. This method is applied in computer arithmetic thus allowing to use a ripple adder for addition as well as subtraction.

In accordance with a further aspect of the present invention, a binary coder of a first word and a second word can create a codeword with no carry-out by applying a ripple adder scheme to the first and the second word. By complementing the second word and adding the complemented second word to the codeword with the same ripple adder scheme as in the coder, providing a carry-in to the least significant digit, one can recreate the first word. It should be clear that coder and decoder are almost identical. The differences are a unit that creates a complement of the second word. Furthermore, the ripple adder scheme has to perform an addition carry calculation, due to the carry-in. Computer arithmetic is well known. It is for instance explained in: Gerrit A. Blaauw, Digital System Implementation, Prentice-Hall, Englewood Cliffs, N.J. 1976.

A two's complement binary coder scheme with the XOR function as the reversible function and the following functions provided in the table as carry function form a reversible coding combination.

| ccarb1 | 0 | 1 |
|---|---|---|
| 0 | 0 | 0 |
| 1 | 0 | 1 |

| ccarb2 | 0 | 1 |
|---|---|---|
| 0 | 0 | 1 |
| 1 | 0 | 0 |

| ccarb3 | 0 | 1 |
|---|---|---|
| 0 | 1 | 0 |
| 1 | 1 | 0 |

| ccarb4 | 0 | 1 |
|---|---|---|
| 0 | 1 | 1 |
| 1 | 1 | 1 |

One may apply such a two's complement ripple adder scheme also to words of symbols for n>2. For instance one may apply in a complement ripple adder scheme for n=3 wherein the reversible function is the modulo-3 addition. One may recover a word from a codeword created by adding by ripple adder scheme to a second word by complementing the second word and adding the complemented second word by applying a decoding ripple adder scheme to the codeword and the complemented second word and using a carry in. The coding and decoding ripple adder scheme apply the same functions. Non-reversible 3-state carry functions that will enable the coding and decoding are provided in the following tables.

| cc31 | 0 | 1 | 2 |
|---|---|---|---|
| 0 | 0 | 0 | 0 |
| 1 | 0 | 0 | 1 |
| 2 | 0 | 1 | 1 |

| sc32 | 0 | 1 | 2 | cc33 | 0 | 1 | 2 | cc34 | 0 | 1 | 2 |
|---|---|---|---|---|---|---|---|---|---|---|---|
| 0 | 0 | 0 | 1 | 0 | 0 | 1 | 1 | 0 | 1 | 2 | 2 |
| 1 | 0 | 1 | 1 | 1 | 0 | 0 | 0 | 1 | 1 | 1 | 1 |
| 2 | 0 | 0 | 0 | 2 | 0 | 0 | 1 | 2 | 1 | 1 | 2 |

Additional functions are possible and fully contemplated.

One can modify the truth table of the modulo-3 adder by interchanging columns of the truth table. This may lead to the following reversible function in a 3-state two' complement ripple adder scheme with the following truth table.

| add3_mod | 0 | 1 | 2 |
|---|---|---|---|
| 0 | 1 | 2 | 0 |
| 1 | 2 | 0 | 1 |
| 2 | 0 | 1 | 2 |

The following table shows the truth tables of 3-state carry functions that will enable the two's complement ripple adder coding/decoding with add3_mod as reversible function.

| cc35 | 0 | 1 | 2 |
|---|---|---|---|
| 0 | 0 | 0 | 1 |
| 1 | 0 | 1 | 1 |
| 2 | 1 | 1 | 1 |

| sc36 | 0 | 1 | 2 | cc37 | 0 | 1 | 2 | cc38 | 0 | 1 | 2 |
|---|---|---|---|---|---|---|---|---|---|---|---|
| 0 | 0 | 1 | 1 | 0 | 1 | 2 | 2 | 0 | 2 | 2 | 2 |
| 1 | 1 | 1 | 1 | 1 | 2 | 2 | 2 | 1 | 1 | 1 | 2 |
| 2 | 0 | 0 | 1 | 2 | 1 | 1 | 2 | 2 | 1 | 2 | 2 |

While apparatus and methods may have been illustrated in 3-state or 4-state examples, they are contemplated to also work in n-state implementations with n>3 or n>4.

It has been shown in accordance with one aspect of the present invention that one may only determine one carry of two corresponding n-state symbols in one carry cycle to determine a codeword. In that case an n-state symbol in a codeword may be influenced by only one other symbol in a codeword. In a ripple adder scheme one resolves a ripple effect by determining a carry, or carry-like symbol in repetitive cycles until all possible symbols have been processed and no additional carry can be determined without repeating previous steps. A codeword of p n-state symbols can thus be processed by p−1 consecutive steps of determining a carry and p steps of "adding". Processing a complete ripple of a word of p n-state symbols herein is intended to be in one embodiment the execution of (p−1) cycles of determining a "sum" and a "carry", followed by a final determination of a "sum". This means that one determines (p−1) times a carry and p times a "sum". In decoding "carry" is a "borrow" and "sum" is "difference", which are determined by their respective n-state logic functions.

The methods and apparatus that are provided as aspects of the present invention may be implemented in a processor which also has a memory and that is enabled to store, retrieve instructions from the memory and to execute the instructions to operate on signals that represent data. Such processors may be micro-processors or customized circuitry to perform dedicated instructions. It may also be a Digital Signal processor. It may be part of a computing device, which may be connected with a wire or wirelessly to a network. A computing device may be a mobile device such as a mobile phone, a mobile computer a PDA or any other computing device that is enabled to perform the methods of the present invention. A computing device may be an ATM machine. A processor may be implemented in for instance Field programmable Gate Arrays (FPGAs). Such circuitry may be enabled to process binary signals. An n-state symbol may be represented by two or more binary signals. Binary circuitry may implement n-state switching truth tables. Circuitry may also be enabled to process n-state signals.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Pat. No. 7,002,490, dated Feb. 21, 2006, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Pat. No. 7,218,144, dated May 15, 2007, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Pat. No. 7,397,690, dated Jul. 8, 2008, entitled MULTI-VALUED DIGITAL INFORMATION RETAINING ELEMENTS AND MEMORY DEVICES.

What is claimed:

1. A method of coding with a computing device a first plurality of p n-state symbols with p and n≧2 into a codeword of p n-state symbols comprising:
    inputting the first plurality of p n-state symbols on the computing device;
    inputting a second plurality of n-state symbols on the computing device;
    processing each of p corresponding n-state symbols in the first and the second plurality of p n-state symbols with a first n-state function to generate a third plurality of p n-state symbols;
    processing at least one set of corresponding n-state symbols in the first and the second plurality of p n-state symbols with a second n-state function to generate one or more n-state transfer symbols;
    processing the third plurality of n-state symbols and the one or more n-state transfer symbols with a third n-state logic function; and
    generating on an output of the computing device the codeword of p n-state symbols.

2. The method of claim 1, wherein the first and the second n-state logic function are not a modulo-n adder and a corresponding modulo-n carry function.

3. The method of claim 1, wherein the first n-state logic function is a reversible logic function.

4. The method of claim 3, wherein the first and the third n-state logic function are the same n-state logic function.

5. The method of claim 1, wherein the second n-state logic function is a non-reversible logic function.

6. The method of claim 1, further comprising processing a complete ripple of n-state transfer symbols through the first plurality of n-state symbols.

7. The method of claim 1, wherein the codeword is generated in a Feistel network.

8. The method of claim 1, wherein an n-state symbol is represented by one or more binary signals.

9. The method of claim 1, wherein an n-state logic function is implemented with binary circuitry.

10. The method of claim 1, wherein the computing device is part of a communication system.

11. The method of claim 1, wherein the computing device is part of a financial system.

12. The method of claim 1, further comprising a corresponding method to retrieve from the codeword the first plurality of p n-state symbols.

13. An apparatus for coding a first plurality of p n-state symbols with p and $n \geqq 2$ into a codeword of p n-state symbols comprising:
   a processor with memory, the memory enabled to store instructions, the processor retrieving the instructions from the memory and executing the instruction on signals representing n-state symbols to perform the steps of:
      receiving signals representing the first plurality of p n-state symbols on a first input;
      receiving signals representing a second plurality of n-state symbols on a second input;
      processing signals representing each of p corresponding n-state symbols in the first and the second plurality of p n-state symbols with a first n-state function to generate signals representing a third plurality of p n-state symbols;
      processing signals representing at least one set of corresponding n-state symbols in the first and the second plurality of p n-state symbols with a second n-state function to generate one or more n-state transfer symbols;
      processing the signals representing the third plurality of n-state symbols and the one or more n-state transfer symbols with a third n-state logic function; and
      generating signals representing the codeword of p n-state symbols.

14. The apparatus of claim 13, wherein the first and the second n-state logic function are not a modulo-n adder and a corresponding modulo-n carry function.

15. The apparatus of claim 13, wherein the first n-state logic function is a reversible logic function.

16. The apparatus of claim 15, wherein the first and the third n-state logic function are the same n-state logic function.

17. The apparatus of claim 13, further comprising processing a complete ripple of n-state transfer symbols through the first plurality of n-state symbols.

18. The apparatus of claim 17, further comprising an apparatus to determine from the signals representing the codeword the signals representing the first plurality of p n-state symbols.

19. The apparatus of claim 13, wherein the codeword is generated in a Feistel network.

20. The apparatus of claim 13, wherein an n-state symbol is represented by one or more binary signals.

21. The apparatus of claim 13, wherein an n-state logic function is implemented with binary circuitry.

22. The apparatus of claim 13, wherein the apparatus is part of a financial system.

\* \* \* \* \*